US008703844B2

(12) United States Patent
Burckhardt et al.

(10) Patent No.: US 8,703,844 B2
(45) Date of Patent: Apr. 22, 2014

(54) LOW-VISCOSITY EPOXY RESIN COMPOSITION WITH LOW BLUSHING

(75) Inventors: Urs Burckhardt, Zürich (CH); Ursula Stadelmann, Zürich (CH); Pierre-André Bütikofer, Wallisellen (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/492,251

(22) Filed: Jun. 8, 2012

(65) Prior Publication Data

US 2012/0270967 A1 Oct. 25, 2012

Related U.S. Application Data

(63) Continuation of application No. PCT/EP2010/068333, filed on Nov. 26, 2010.

(30) Foreign Application Priority Data

Dec. 8, 2009 (EP) ..................................... 09178262

(51) Int. Cl.
*C08G 59/50* (2006.01)
(52) U.S. Cl.
USPC ........................................................ 523/400
(58) Field of Classification Search
USPC ........................................................ 523/400
See application file for complete search history.

(56) References Cited

U.S. PATENT DOCUMENTS

| | | | |
|---|---|---|---|
| 3,331,795 A | 7/1967 | Hopper | |
| 4,812,493 A * | 3/1989 | Cummings | 523/412 |
| 5,415,689 A * | 5/1995 | Wekenmann et al. | 106/14.15 |
| 5,610,239 A * | 3/1997 | Skelley | 525/331.7 |
| 5,900,463 A * | 5/1999 | Tanimoto et al. | 525/61 |
| 2007/0055038 A1* | 3/2007 | Gimmnich et al. | 528/49 |
| 2007/0224362 A1 | 9/2007 | Briand et al. | |
| 2008/0152833 A1* | 6/2008 | Klinkenberg et al. | 427/520 |
| 2008/0314518 A1* | 12/2008 | Sutter et al. | 156/331.7 |
| 2009/0017311 A1* | 1/2009 | Kislig | 428/423.1 |
| 2009/0065143 A1* | 3/2009 | Frick et al. | 156/330 |
| 2009/0099333 A1* | 4/2009 | Burckhardt | 528/310 |
| 2009/0176944 A1* | 7/2009 | Burckhardt | 525/452 |
| 2009/0202837 A1* | 8/2009 | Onuoha et al. | 428/413 |
| 2009/0286919 A1* | 11/2009 | Moller et al. | 524/523 |
| 2011/0198031 A1* | 8/2011 | Burckhardt | 156/331.7 |
| 2013/0130039 A1* | 5/2013 | Schlumpf et al. | 428/423.1 |

FOREIGN PATENT DOCUMENTS

GB 960236 A 6/1964

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Jun. 21, 2012, issued in corresponding International Application No. PCT/EP2010/068333. (7 pages).
International Search Report (PCT/ISA/210) issued on Feb. 25, 2011, by the European Patent Office as the International Searching Authority for International Application No. PCT/EP2010/068333.
Written Opinion (PCT/ISA/237) issued on Feb. 25, 2011, by the European Patent Office as the International Searching Authority for International Application No. PCT/EP2010/068333.

* cited by examiner

*Primary Examiner* — Mark Eashoo
*Assistant Examiner* — Megan McCulley
(74) *Attorney, Agent, or Firm* — Buchanan Ingersoll & Rooney PC

(57) ABSTRACT

A two-component epoxy resin composition, including: a resin component which includes at least one epoxy resin and at least one aldehyde, and a hardener component which includes at least one polyamine having at least one primary amino group.

23 Claims, No Drawings

LOW-VISCOSITY EPOXY RESIN COMPOSITION WITH LOW BLUSHING

RELATED APPLICATION(S)

This application claims priority as a continuation application under 35 U.S.C. §120 to PCT/EP2010/068333, which was filed as an International Application on Nov. 26, 2010 designating the U.S., and which claims priority to European Application No. 09178262.3 filed in Europe on Dec. 8, 2009. The entire contents of these applications are hereby incorporated by reference in their entireties.

FIELD

Disclosed are epoxy resin compositions and their uses, for example, as coatings, floor covers, and paint finishes.

BACKGROUND INFORMATION

Two-component epoxy resin compositions used as coatings can consist of a resin component which comprises an epoxy resin, and of a hardener component which comprises compounds that are reactive with epoxy groups, for example, primarily polyamines. The two components are mixed for use, and they cure at ambient temperature. Systems can have several properties that are undesirable in practice.

Epoxy resins, for example, those based on bisphenols, are viscous fluids or solids. For use in two-component epoxy resin compositions for coatings, they can be diluted to achieve a good miscibility of the two components, and a good processability at ambient temperatures. For the dilution, low-viscosity epoxies, so-called epoxy reactive diluents, can be used. However, they can be expensive, they can have a strong irritating effect, and they can lower the strength of the cured system in an undesirable manner. The epoxy resins can also be diluted with organic solvents. However, the latter can be volatile organic compounds (VOC; Volatile Organic Compound) which, during and after the processing of the epoxy resin composition, enter into the atmosphere due to evaporation, and can represent a hazard for humans and for the environment, because they can be highly flammable, they can cause odor emissions, and they can be capable of causing nausea, injuries to health, and environmental damage.

The polyamines that can be used as hardeners can present, due to their content of primary amino groups, the undesirable characteristic that they are capable of forming stable carbonate and carbamate salts, with gaseous carbon dioxide ($CO_2$) from the air in combination with moisture. Hardeners that are based on such polyamines can, for example, not be stored open in the air, because crusts form on the container. Such hardeners, even when they are used in a coating—after mixing in the epoxy resin and during the curing—can be capable of taking up $CO_2$, which can result in undesired effects, such as a tacky surface with tarnishing or spotting, and incomplete curing. These effects are referred to as "blushing" by the person skilled in the art. To suppress crust formation and blushing, and at the same time to achieve dilution, epoxy resin compositions can be mixed with considerable quantities of benzyl alcohol, which can result in undesirable effects. For example, although benzyl alcohol is relatively free of odors and presents low volatility, it is nonetheless a VOC, and consequently benzyl alcohol-containing composition cannot be declared to be VOC-free. Epoxy resin compositions having a high content of benzyl alcohol, moreover, tend to form bubbles, for example, on porous substrates, they have a reduced resistance to abrasion, and they can perform poorly in emission tests in interior spaces. Alkyl phenols, such as nonyl phenol, are also used to suppress blushing, but they can be problematic for reasons pertaining to toxicity.

Secondary amino groups do not undergo a spontaneous reaction with $CO_2$, or their carbonates and carbamates are not stable. Polyamines having primarily secondary amino groups therefore can lead to little blushing in epoxy resin compositions. However, polyamines comprising only secondary amino groups are rarely used, because they can be expensive to produce, and lead to long curing times. Polyamines with adducted diepoxies, as well as so-called polyamidoamines, can be used. Both comprise besides primarily secondary amino groups also primary amino groups, and they can exhibit little blushing. However, their viscosity can be so high that they have to be diluted, which again can entail the mentioned undesirable effects.

SUMMARY

According to an exemplary aspect, a two-component epoxy resin composition is provided, comprising: a resin component K1 which includes at least one epoxy resin and at least one aldehyde, and a hardener component K2 which includes at least one polyamine A1 having at least one primary amino group.

According to an exemplary aspect, a cured composition formed from an exemplary two-component epoxy resin composition is provided, wherein the cured composition is obtained by mixing the resin component K1 and the hardener component K2.

According to an exemplary aspect, a method of using an exemplary two-component epoxy resin composition is provided, the method comprising mixing the resin component K1 and the hardener component K2.

According to an exemplary aspect, a method of forming a resin component suitable for use in a two-component epoxy resin composition is provided, the method comprising: adding to an epoxy resin or an epoxy resin composition an aldehyde selected from the group consisting of a benzaldehyde and an aldehyde of formula (II):

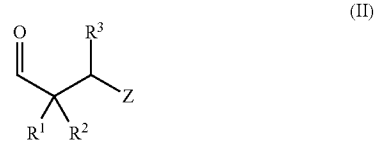

where $R^1$ and $R^2$ in each case stand, independently of each other, either for a monovalent hydrocarbon residue having 1-12 C atoms, or together for a bivalent hydrocarbon residue having 4-12 C atoms, which is part of an optionally substituted carbocyclic ring having 5-8 C atoms; $R^3$ stands for a hydrogen atom or for an arylalkyl or cycloalkyl or alkyl group having 1-12 C atoms; and Z stands for an ester, ether, tertiary amino or amido group having up to 31 C atoms, which groups optionally contain additional ether oxygens.

According to an exemplary aspect, a method is provided for reducing blushing effects during a curing of a two-component epoxy resin composition whose hardener component comprises at least one polyamine having at least one primary amino group, the method comprising: adding an aldehyde to the resin component, wherein the aldehyde is selected from the group consisting of a benzaldehyde and an aldehyde of formula (II):

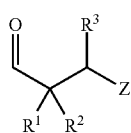
(II)

where $R^1$ and $R^2$ in each case stand, independently of each other, either for a monovalent hydrocarbon residue having 1-12 C atoms, or together stand for a bivalent hydrocarbon residue having 4-12 C atoms, which is part of an optionally substituted carbocyclic ring having 5-8 C atoms; $R^3$ stands for a hydrogen atom or for an arylalkyl or cycloalkyl or alkyl group having 1-12 C atoms; and Z stands for an ester, ether, tertiary amino or amido group having up to 31 C atoms, which groups optionally contain additional ether oxygens.

DETAILED DESCRIPTION

Disclosed are exemplary two-component epoxy resin compositions whose resin component presents a highly manageable viscosity, and which present few blushing effects in areal application, and which cure to coatings of good quality.

In an exemplary two-component epoxy resin composition, the viscosity of the resin component can be surprisingly low, since the aldehyde is surprisingly compatible with the epoxy resin, and dilutes the latter well, for example, if the aldehyde is liquid at room temperature. In an exemplary embodiment, using an exemplary composition, even in areal application, few blushing effects occur, since the aldehyde can reduce the content of primary amino groups during the mixing of the components by chemical reaction until they no longer react observably with $CO_2$. In an exemplary process, the aldehyde can be bound covalently in the composition. During the curing, substantially clear, glossy and nonadhesive films having excellent mechanical properties can be produced. For example, high-quality epoxy resin coatings can be provided that comprise no or a clearly reduced content of VOC and epoxy reactive diluents.

According to an exemplary aspect, a two-component epoxy resin composition is disclosed, including a resin component K1 which comprises at least one epoxy resin and at least one aldehyde, and a hardener component K2 which comprises at least one polyamine A1 having at least one primary amino group.

The resin component K1 can have an aldehyde content of at least 1 wt %, for example, at least 3 wt %.

The two-component epoxy resin composition can be suitable as a coating.

In the present document, substance names starting with "poly," such as, polyamine, polyol or polyepoxy denote substances that according to the formula contain two or more of the functional groups occurring in their name per molecule. Compounds having two epoxy groups are referred to as "diepoxy."

The structural element

is referred to as "epoxy group" in the present document.

The broken lines in the formulas in this document in each case represent the bond between a substituent and the associated molecule residue.

The term "glycidyl ether" in the present document denotes an ether of 2,3-epoxy-1-propanol (glycidol).

The abbreviation "EEW" in the present document stands for "epoxy equivalent weight."

In the present document, the term "primary" amino group denotes an $NH_2$ group which is bound to an organic residue, and the term "secondary" amino group denotes an NH group which is bound to two organic residues which together can also be part of a ring.

"Room temperature" in the present document denotes a temperature of 23° C.

The term "diluting" in the present document denotes the lowering of the viscosity of a liquid.

The boldface designations, such as, K1, K2, A1, A2, ALD or the like, are used in the present document only to improve the readability and for identification.

The resin component K1 of the two-component epoxy resin composition comprises at least one epoxy resin.

Suitable epoxy resins include epoxy resins used in epoxy chemistry. They are obtained in any suitable manner, for example, from the oxidation of the corresponding olefins or from the reaction of epichlorohydrin with the corresponding polyols, polyphenols or amines.

For example, so-called polyepoxy liquid resins, hereafter referred to as "liquid resin," can be suitable as epoxy resin. They have a glass transition temperature that can be less than 25° C., in contrast to the so-called solid resins which have a glass transition temperature above 25° C., and which can be comminuted at 25° C. to pourable powders.

In an exemplary embodiment, the liquid resin is an aromatic polyepoxy. Suitable liquid resins can have the formula (I)

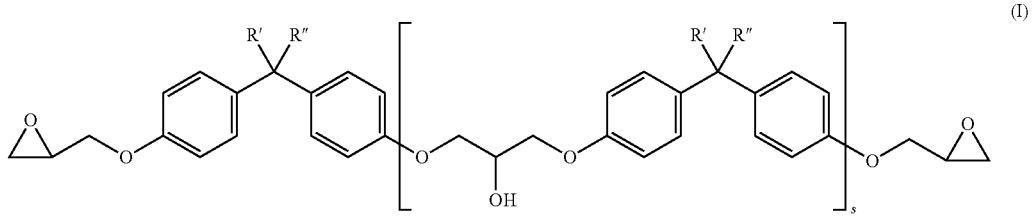

where R' and R", independently of each other, in each case stand for a hydrogen atom or for a methyl group, and s on average stands for a value from 0 to 1. Exemplary liquid resins of formula (I) are those in which the index s on average has a value of less than 0.2.

The liquid resins of formula (I) are diglycidyl ethers of bisphenol A, bisphenol F and bisphenol A/F, where A stands for acetone and F for formaldehyde, which are used as educts for the preparation of these bisphenols. A bisphenol A liquid resin can comprise methyl groups, a bisphenol F liquid resin comprises hydrogen atoms, and a bisphenol A/F liquid resin comprises both methyl groups and also hydrocarbon atoms as R' and R" in formula (I). In the case of bisphenol F, positional isomers can also be present, for example, those derived from 2,4'- and 2,2'-hydroxyphenylmethane.

Additional suitable aromatic liquid resins include the glycidylization products of
dihydroxybenzene derivatives, such as, resorcinol, hydroquinone and catechol;
additional bisphenols or polyphenols, such as, bis-(4-hydroxy-3-methylphenyl)-methane, 2,2-bis-(4-hydroxy-3-methylyphenyl)-propane(bisphenol C), bis-(3,5-dimethyl-4-hydroxyphenyl)-methane, 2,2-bis-(3,5-dimethyl-4-hydroxyphenyl)-propane, 2,2-bis-(3,5-dibromo-4-hydroxyphenyl)-propane, 2,2-bis-(4-hydroxy-3-tert.-butylphenyl)-propane, 2,2-bis-(4-hydroxyphenyl)-butane (bisphenol B), 3,3-bis-(4-hydroxyphenyl)-pentane, 3,4-bis-(4-hydroxyphenyl)-hexane, 4,4-bis-(4-hydroxyphenyl)-heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol Z), 1,1-bis-(4-hydroxyphenyl)-3,3,5-trimethylcyclohexane(bisphenol TMC), 1,1-bis-(4-hydroxyphenyl)-1-phenylethane, 1,4-bis[2-(4-hydroxyphenyl)-2-propyl]-benzene) (bisphenol P), 1,3-bis-[2-(4-hydroxyphenyl)-2-propyl]-benzene) (bisphenol M), 4,4'-dihydroxydiphenyl (DOD), 4,4'-dihydroxybenzophenone, bis-(2-hydroxynaphth-1-yl)-methane, bis-(4-hydroxynaphth-1-yl)-methane 1,5-dihydroxy-naphthalene, tris-(4-hydroxyphenyl)-methane, 1,1,2,2-tetrakis-(4-hydroxyphenyl)-ethane bis-(4-hydroxyphenyl)-ether, bis-(4-hydroxyphenyl)sulfone;
condensation products of phenols with formaldehyde, which are obtained under acidic conditions, such as, phenol novolaquers or cresol novolacquers, also referred to as bisphenol F novolacquers;
aromatic amines, such as, aniline, toluidine, 4-aminophenol, 4,4'-methylenediphenyldiamine (MDA), 4,4'-methylenediphenyldi(N-methyl)-amine, 4,4'-[1,4-phenylene-bis-(1-methylethylidene)]-bisaniline(bisaniline P), and 4,4'-[1,3-phenylene-bis-(1-methylethylidene)]-bisaniline (bisaniline M).

Also suitable, as epoxy resin, is an aliphatic or cycloaliphatic polyepoxy, such as, for example
a glycidyl ether of a saturated or unsaturated, branched or unbranched, cyclic or open-chained $C_2$-$C_{30}$ diol, such as, for example, ethylene glycol, propylene glycol, butylene glycol, hexanediol, octanediol, a polypropylene glycol, dimethylolcyclohexane, neopentyl glycol or dibromoneopentyl glycol;
a glycidyl ether of a tri- or tetrafunctional, saturated or unsaturated, branched or unbranched, cyclic or open-chained polyol, such as, castor bean oil, trimethylolpropane, trimethylolethane, pentaerythrol, sorbitol or glycerol, as well as alkoxylated glycerol or alkoxylated trimethylolpropane;
a hydrated bisphenol A, F or A/F liquid resin, or the glycidylization products of hydrated bisphenol A, F or A/F; and
an N-glycidyl derivative of amides or heterocyclic nitrogen bases, such as, triglycidyl cyanurate and triglycidyl isocyanurate, as well as reaction products of epichlorohydrin and hydantoin.

Additional possible epoxy resins are bisphenol A, F or A/F solid resin whose structure is similar to that of the already mentioned liquid resins of formula (I), except that the index s has a value of 2-12, and the glass transition temperature is higher than 25° C.

As epoxy resin, it is also suitable to use epoxy resins from the oxidation of olefins, for example, from the oxidation of vinylcylohexene, dicyclopentadiene, cyclohexadiene, cyclododecadiene, cyclododecatriene, isoprene, 1,5-hexadiene, butadiene, polybutadiene or divinylbenzene.

As epoxy resin, it is possible to use liquid resins based on a bisphenol, for example, based on bisphenol A, bisphenol F or bisphenol A/F, which are commercially available, for example, from Dow, Huntsman, and Hexion, wherein said liquid resins are optionally present in combination with bisphenol A solid resin or bisphenol F novolacquer epoxy resin.

The epoxy resin can comprise a reactive diluent, for example, an epoxy reactive diluent. Suitable as epoxy reactive diluents are low-viscosity mono- and polyepoxies, such as, for example, the glycidyl ethers of monovalent or polyvalent phenols, and aliphatic or cycloaliphatic phenols, such as, for example, the already mentioned polyglycidyl ethers of di- or polyols, as well as, for example, phenyl glycidyl ether, cresyl glycidyl ether, p-n-butylphenyl glycidyl ether, p-tert-butylphenyl glycidyl ether, nonylphenyl glycidyl ether, allyl glycidyl ether, butyl glycidyl ether, hexyl glycidyl ether, 2-ethylhexyl glycidyl ether, as well as glycidyl ethers of natural alcohols, such as, for example, $C_8$-$C_{10}$ alkyl glycidyl ethers or $C_{12}$-$C_{14}$ alkyl glycidyl ethers. The addition of a reactive diluent to the epoxy resin can result in a reduction of the viscosity, as well as—in the cured state of the epoxy resin composition—a reduction of the glass transition temperature and of the mechanical values.

The resin component K1 can comprise only a low content of epoxy reactive diluent or, for example, it is free of epoxy reactive diluent.

The resin component K1 of the two-component epoxy resin composition can comprise at least one aldehyde.

Exemplary suitable aldehydes are aldehydes that are liquid at room temperature, for example, propanol, 2-methylpropanal, butanal, 2-methylbutanal, 2-ethylbutanal, pentanal, pivalaldehyde, 2-methylpentanal, 3-methylpentanal, 4-methylpentanal, 2,3-dimethylpentanal, hexanal, 2-ethylhexanal, heptanal, octanal, nonanal, decanal, undecanal, 2-methylundecanal, dodecanal, methoxyacetaldehyde, cyclopropanecarboxaldehyde, cyclopentanecarboxaldehyde, cyclohexanecarboxaldehyde, 2,2-dimethyl-3-phenylpropanal; 1-naphthaldehyde, benzaldehyde or substituted benzaldehydes, for example, the isomeric tolualdehydes, salicylaldehyde, and m-phenoxybenzaldehyde; and cinnamic aldehyde.

For example, as aldehyde, aldehydes of formula (II) are suitable.

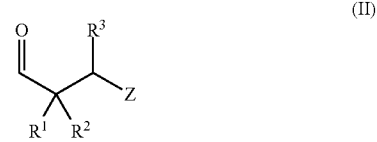

(II)

In formula (II),
$R^1$ and $R^2$ in each case stand, independently of each other, either for a monovalent hydrocarbon residue having 1-12 C atoms, or together for a bivalent hydrocarbon residue having 4-12 C atoms, which is part of an optionally substituted carbocyclic ring having 5-8, for example, 6 C atoms;
$R^3$ stands for a hydrogen atom or for an arylalkyl or cycloalkyl or alkyl group having 1-12 C atoms, for example, a hydrogen atom; and Z stands for an ester, ether, tertiary amino or amido group having up to 31 C atoms, which groups optionally comprise additional ether oxygens.

For example, $R^1$ and $R^2$ can stand in each case for a methyl residue. For example, $R^3$ can stand for a hydrogen atom.

Z can stand for a residue of formula (III) or (IV),

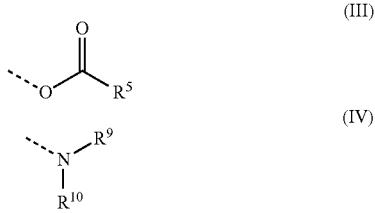

where
$R^5$ stands either for a hydrogen atom,
or for a linear or branched alkyl residue having 1-30 C atoms, optionally with cyclic portions, and optionally with at least one heteroatom, for example, oxygen in the form of ether, carbonyl or ester groups,
or for a singly or multiply unsaturated, linear or branched hydrocarbon residue having 5-30 C atoms,
or for an optionally substituted, aromatic or heteroaromatic, 5- or 6-membered ring; and
$R^9$ and $R^{10}$, independently of each other, in each case stand either for a monovalent aliphatic, cycloaliphatic or arylaliphatic residue having 1-20 C atoms, which optionally comprises heteroatoms in the form of ether oxygen or tertiary amine nitrogen,
or together they stand for a bivalent aliphatic residue having 3-20 C atoms, which is part of an optionally substituted, heterocyclic ring having 5-8, for example, 6 ring atoms, and comprises, besides the nitrogen atom, optionally additional heteroatoms in the form of ether oxygen or tertiary amine nitrogen.

For example, $R^5$ can stand for a linear or branched alkyl residue having 6-30, for example, 11-30 C atoms, optionally with cyclic portions, and optionally with at least one heteroatom, or for a singly or multiply unsaturated, linear or branched hydrocarbon residue having 6-30, for example, 11-30 C atoms.

For example, $R^5$ can stand for a linear or branched alkyl residue having 6-30, for example, 11-30 C atoms, optionally with cyclic portions and optionally with at least one heteroatom.

$R^9$ and $R^{10}$ can stand, in each case independently of each other, for a methyl, ethyl, propyl, isopropyl, butyl, isobutyl, 2-ethylhexyl, cyclohexyl, benzyl or alkoxyethyl group, or they form together—including the nitrogen atom—a ring, for example, a pyrrolidine, piperidine, morpholine or N-alkylpiperazine ring, wherein said ring is optionally substituted. $R^9$ and $R^{10}$ can stand, in each case independently of each other, for a benzyl or methoxyethyl group, or they form together, including the nitrogen atom, a morpholine ring.

Aldehydes of formula (II) that are liquid at room temperature are exemplary.

The aldehydes can be liquid at room temperature. Aldehydes that are solid at room temperature can be used and can also dilute the resin component K1 very well, for example, provided that the latter is heated to a temperature above the melting point of the aldehyde in question.

Aldehydes of formula (II), which contain a residue of formula (III) as residue Z, are esters of aliphatic, cycloaliphatic or arylaliphatic 2,2-disubstituted 3-hydroxyaldehydes, such as, for example, 2,2-dimethyl-3-hydroxypropanal, with suitable carboxylic acids, wherein, as carboxylic acids, the following are exemplary: saturated aliphatic carboxylic acids, such as, for example, formic acid, acetic acid, propionic acid, butyric acid, isobutyric acid, valeric acid, caproic acid, 2-ethylcaproic acid, enanthic acid, caprylic acid, pelargonic acid, capric acid, undecanoic acid, lauric acid, tridecanoic acid, myristic acid, pentadecanoic acid, palmitic acid, heptadecanoic acid, stearic acid, nonadecanoic acid, icosanoic acid; simple unsaturated aliphatic carboxylic acids, such as, palmitoleic acid, oleic acid, erucic acid; multiply unsaturated aliphatic carboxylic acids, such as, linoleic acid, linolenic acid, eleostearic acid, arachidonic acid; cycloaliphatic carboxylic acids, such as cyclohexanoic carboxylic acid; arylaliphatic carboxylic acids, such as, phenylacetic acid; aromatic carboxylic acids, such as, benzoic acid, naphthoic acid, toluic acid, anisic acid; isomers of said acids; fatty acid mixtures from the technical saponification of natural oils and fats, such as, for example, rapeseed oil, sunflower seed oil, linseed oil, olive oil, coconut oil, palm kernel oil, palm oil; as well as dicarboxylic acid monoalkyl and aryl esters, such as those obtained from the simple esterification of dicarboxylic acids, such as, succinic acid, glutaric acid, adipic acid, pimelic acid, octanedioic acid, nonanedioic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid, and similar derivatives of polyethylene glycol, with alcohols, such as, methanol, ethanol, propanol, butanol, higher homologs and isomers of said alcohols. Carboxylic acids having at least 7 C atoms are exemplary, for example, those having 12-31 C atoms, for example, lauric acid, myristic acid, palmitic acid, stearic acid and oleic acid. Lauric acid is exemplary.

The aldehyde can be selected from 2-ethylbutanal, pentanal, pivalaldehyde, 2-methylpentanal, 3-methylpentanal, 4-methylpentanal, 2,3-dimethylpentanal, hexanal, 2-ethylhexanal, heptanal, octanal, methoxyacetaldehyde, 2,2-dimethyl-3-phenylpropanal, benzaldehyde, 1-naphthaldehyde, salicylaldehyde and aldehydes of formula (II), for example, 3-acetoxy-2,2-dimethylpropanal, 2,2-dimethyl-3-lauroyloxypropanal, 2,2-dimethyl-3-(N-morpholino)-propanal and 2,2-dimethyl-3-bis-(methoxyethyl)-aminopropanal.

For example, the aldehyde can be selected from benzaldehyde, salicylaldehyde, 2,2-dimethyl-3-phenylpropanal, 3-acetoxy-2,2-d imethylpropanal, 2,2-dimethyl-3-lauroyloxypropanal, and 2,2-dimethyl-3-(N-morpholino)-propanal.

As aldehyde, it is possible to use the aldehydes of formula (II), which have a residue of formula (III) as residue Z, wherein $R^5$ comprises 11-30 C atoms, for example, 11-20 C atoms. Such aldehydes are also referred to as ALD aldehydes below. The ALD aldehydes can include odorless substances. The odorless substance can be a substance which has no odor for most human individuals, that is, it presents no perceivable odor. When using such ALD aldehydes, resin components K1 can be produced that are odorless and VOC-free.

2,2-Dimethyl-3-lauroyloxypropanal is exemplary as ALD aldehyde.

The hardener component K2 of the two-component epoxy resin composition comprises at least one polyamine A1 having at least one primary amino group.

The following polyamines can be suitable as polyamine A1:
aliphatic, cycloaliphatic or arylaliphatic primary diamines, for example, ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis-(4-aminocyclohexyl)-methane ($H_{12}$-MDA), bis-(4-amino-3-methylcyclohexyl)-methane, bis-(4-amino-3-ethylcyclohexyl)-methane, bis-(4-amino-3,5-dimethylcyclohexyl)-methane, bis-(4-amino-3-ethyl-5-methylcyclohexyl)-methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[5.2.1.0"]decane, 1,4-diamino-2,2,6-trimethylcyclohexane (TMCDA), 1,8-menthanediamine, 3,9-bis-(3-aminopropyl)-2,4,8,10-tetraoxaspiro[5.5]undecane as well as 1,3- and 1,4-xylylenediamine;

ether group-containing aliphatic primary diamines, for example, bis-(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of said diamines, bis-(3-aminopropyl)polytetrahydrofurans and other polytetrahydrofuran-diamines with molecular weights in the range of, for example, 350-2000, as well as polyoxyalkylenediamines. The latter can represent products from the amination of polyoxyalkylenediols, and they are available, for example, under the name Jeffamine® (from Huntsman), under the name polyetheramine (from BASF) or under the name PC Amine® (from Nitroil). Suitable polyoxyalkylenediamines are Jeffamine® D-230, Jeffamine® D-400, Jeffamine® D-2000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; Polyetheramine D 230, Polyetheramine D 400 and Polyetheramine D 2000, PC Amine® DA 250, PC Amine® DA 400, PC Amine® DA 650 and PC Amine® DA 2000;

aliphatic, cycloaliphatic or arylaliphatic primary triamines, such as, 4-aminomethyl-1,8-octanediamine, 1,3,5-tris-(aminomethyl)-benzene, 1,3,5-tris-(aminomethyl)-cyclohexane, tris-(2-aminoethyl)-amine, tris-(2-aminopropyl)-amine, and tris-(3-aminopropyl)-amine;

primary polyoxyalkylene-triamines, which can be products from the amination of polyoxyalkylenetriols, and are available, for example, under the commercial name Jeffamine® (from Huntsman), under the name polyetheramine (from BASF) or under the name PC Amine® (from Nitroil), such as, for example, Jeffamine® T-403, Jeffamine® T-3000, polyetheramine T403 and PC Amine® TA 403;

tertiary amino group-comprising polyamines, such as, for example, N,N'-bis-(aminopropyl)-piperazine, N,N-bis-(3-aminopropyl)methylamine, N,N-bis-(3-aminopropyl) ethylamine, N,N-bis-(3-aminopropyl)propylamine, N,N-bis-(3-aminopropyl)cyclohexylamine, N,N-bis-(3-aminopropyl)-2-ethylhexylamine, as well as the products of the double cyanoethylation and subsequent reduction of fatty amines which are derived from natural fatty acids, such as, N,N-bis-(3-aminopropyl)-dodecylamine and N,N-bis-(3-aminopropyl)-talc alkylamine, available as Triameen® Y12D and Triameen® YT (from Akzo Nobel);

secondary amino group-comprising polyamines, such as, for example, diethylenetriamine (DETA), dipropylenetriamine (DPTA), bis-hexamethylenetriamine (BHMT), 3-(2-aminoethyl)aminopropylamine, N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine, N,N'-dibutylethylenediamine; N,N'-di-tert-butyl-ethylenediamine, N,N'-diethyl-1,6-hexanediamine, 1-(1-methylethyl-amino)-3-(1-methylethyl-aminomethyl)-3,5,5-trimethylcyclohexane (Jefflink® 754 from Huntsman), N4-cyclohexyl-2-methyl-N2-(2-methylpropyl)-2,4-pentanediamine, N,N'-dialkyl-1,3-xylylenediamine, bis-(4-(N-alkylamino)-cyclohexyl)-methane, 4,4'-trimethylene-dipiperidine, N-alkylated polyether amines, for example, the Jeffamine® types SD-231, SD-401, SD-404 and SD-2001 (from Huntsman);

amine/polyepoxy adducts, for example, adducts from the mentioned polyamines with diepoxies in the molar ratio of at least 2/1, for example, in the molar ratio from 2/1 to 6/1;

as well as polyamidoamines which are reaction products from a monovalent or polyvalent carboxylic acid, or its esters or anhydrides, for example, a dimer fatty acid, and an aliphatic, cycloaliphatic or aromatic polyamine used in stoichiometric excess, for example, a polyalkyleneamine, such as, for example, DETA or triethylenetetramine (TETA), for example, the commercially available polyamidoamines Versamid® 100, 125, 140 and 150 (from Cognis), Aradur® 223, 250 and 848 (from Huntsman), Euretek® 3607, Euretek® 530 (from Huntsman), Beckopox® EH 651, EH 654, EH 655, EH 661 and EH 663 (from Cytec);

polyamines A2 having at least one primary and at least two secondary amino groups.

As polyamine A2, the following are exemplary:

aliphatic polyamines comprising two primary and at least two secondary amino groups, for example, so-called polyalkyleneamines, such as, triethylenetetramine (TETA), tetraethylenepentamine (TEPA), pentaethylenehexamine (PEHA), polyethylenepolyamine having 5-7 ethyleneamine units (the so-called "higher ethylenepolyamine," HEPA) and N,N'-bis(3-aminopropyl)ethylenediamine. Such polyalkyleneamines are prepared, for example, from 1,2-dichloroethane and ammonia, or by cyanoethylation or cyanobutylation followed by hydration of primary polyamines;

so-called polyethyleneimines (PEI); they are branched polymer amines from the polymerization of ethyleneimine. An appropriate polyethyleneimine can have an average molecular weight in the range of 250-25,000 g/mol, and it comprises tertiary, secondary and primary amino groups. Polyethyleneimines are available, for example, under the trade names Lupasol® (from BASF), for example the types Lupasol® FG, Lupasol® G20 and Lupasol® PR 8515;

amine/polyepoxy adducts which comprise at least one primary and at least two secondary amino groups, for example, the adducts of polyalkyleneamines with diepoxies in the molar ratio of at least 2/1, for example, in the molar ratio from 2/1 to 6/1, wherein the following can be suitable as polyalkyleneamine: DETA, DPTA, BHMT, 3-(2-aminoethyl)aminopropylamine, N3-(3-aminopentyl)-1,3-pentanediamine, N5-(3-aminopropyl)-2-methyl-1,5-pentanediamine, N5-(3-amino-1-ethylpropyl)-2-methyl-1,5-pentanediamine, TETA, TEPA, PEHA, HEPA and N,N'-bis(3-aminopropyl)ethylenediamine;

polyamidoamines which comprise at least one primary and at least two secondary amino groups, such as, for example, the reaction product of a monovalent or polyvalent carboxylic acid, or its esters or anhydrides, and a polyalkyleneamine, such as, for example, DETA or TETA.

As polyamine A1, the polyamines A2 can be used as well as 1,5-diamino-2-methylpentane (MPMD), 2-butyl-2-ethyl-1,5-pentanediamine (C11-neodiamine), 2,2,4- and 2,4,4-trimethylhexamethylenediamine (TMD), bis-(4-amino-3-methylcyclohexyl)-methane, 1-amino-3-aminomethyl-3,5,5-trimethylcyclohexane (=isophoronediamine or IPDA), 1,3-bis-(aminomethyl)cyclohexane, 3(4),8(9)-bis-(aminomethyl)-tricyclo[$5.2.1.0^{2,6}$]decane, 1,3-xylylenediamine, and ether group-containing di- and triamines from the amination of polyoxyalkylene diolenes and triolenes having a molecular weight of 500 g/mol, for example, the commercial types Jeffamine® D-230, Jeffamine® D-400 and Jeffamine® T-403 (from Huntsman).

An exemplary polyamine A1 is a polyamine A2 having at least one primary and at least two secondary amino groups.

The polyamine A2 can be selected from TETA, TEPA, PEHA, HEPA, N,N'-bis(3-aminopropyl)ethylenediamine; adducts of DETA, DPTA, BHMT, TETA, TEPA, PEHA, HEPA or N,N'-bis(3-aminopropyl)ethylenediamine with a diglycidyl ether, for example, diglycidyl ether of bisphenol A, bisphenol F, bisphenol NF, ethylene glycol, propylene glycol, butylene glycol, hexanediol, octanediol or a polypropylene glycol; and polyamidoamines.

Also suitable as polyamine A1 are mixtures of different polyamines, for example, mixtures of at least one polyamine A2 and at least one additional polyamine having at least one primary amino group.

The ratio of the number of aldehyde groups in the resin component K1 to the number of primary amino groups in the hardener component K2 can be in the range from 0.1 to 1.1.

In an exemplary embodiment where the polyamine A1 comprises only one or no secondary amino group, the ratio of the number of aldehyde groups in the resin component K1 to the number of primary amino groups in the hardener component K2 can be in the range from 0.1 to 0.5.

In an exemplary embodiment where the polyamine A1 comprises at least two secondary amino groups—for example, it is in the form of a polyamine A2—the ratio of the number of aldehyde groups in the resin component K1 to the number of primary amino groups of said polyamine A2 in the hardener component K2 can be in the range from 0.5 to 1.0, for example, in the range from 0.8 to 1.0.

The hardener component K2 of the two-component epoxy resin compositions can comprise, besides the polyamine A1, additional compounds that are reactive with respect to epoxy groups, for example, mercapto group-comprising compounds, such as, for example:

liquid mercaptan-terminated polysulfide polymers, known under the trade name Thiokol® (from Morton Thiokol; available, for example, from SPI Supplies or from Toray Fine Chemicals), for example, the types LP-3, LP-33, LP-980, LP-23, LP-55, LP-56, LP-12, LP-31, LP-32 and LP-2; and also known under the trade name Thioplast® (from Akzo Nobel), for example, the types G 10, G 112, G 131, G 1, G 12, G 21, G 22, G 44 and G 4;

mercaptan-terminated polyoxyalkylene ethers, which can be produced, for example, by reacting polyoxyalkylene diols and triols with epichlorohydrin or with an alkylene oxide, followed by sodium hydrogen sulfide;

mercaptan-terminated epoxy hardener in the form of polyoxyalkylene derivatives, known under the trade name Capcure® (from Cognis), for example, the types WR-8, LOF and 3-800;

polyesters of thiocarboxylic acids, for example, pentaerythritol tetramercaptoacetate, trimethylolpropane trimercaptoacetate, glycol dimercaptoacetate, pentaerythritol tetra-(3-mercaptopropionate), trimethylolpropane tri-(3-mercaptopropionate) and glycol di-(3-mercaptopropionate), as well as the esterification products of polyoxyalkylene diols and triols, ethoxylated trimethylolpropane and polyester diols with thiocarboxylic acids, such as, thioglycolic acid and 2- or 3-mercaptopropionic acid; and additional mercapto group-comprising compounds, such as, for example, 2,4,6-trimercapto-1,3,5-triazine, 2,2'-(ethylenedioxy)-diethanethiol(triethylene glycol dimercaptan) and ethanedithiol.

Both the resin component K1 and also the hardener component K2 can contain additional auxiliary products and additives, such as, for example:

solvents, film forming agents or extenders, such as, toluene, xylene, methyl ethyl ketone, 2-ethoxy ethanol, 2-ethoxyethylacetate, benzyl alcohol, ethylene glycol, diethylene glycol butyl ether, dipropylene glycol butyl ether, ethylene glycol butyl ether, ethylene glycol phenyl ether, N-methylpyrrolidone, propylene glycol butyl ether, propylene glycol phenyl ether, diphenylmethane, diisopropylnaphthalene, mineral oil fractions, such as, for example, Solvesso types (from Exxon), aromatic hydrocarbon resins, for example, phenol group-containing types, sebacates, phthalates, organic phosphoric and sulfonic acid esters and sulfonamides;

reactive diluents, for example, epoxy reactive diluents, as already mentioned above, epoxidized soybean oil or linseed oil, acetoacetate group-comprising compounds, for example, acetoacetylated polyols, butyrolactone, as well as furthermore isocyanates, and reactive group-comprising silicones;

polymers, such as, for example, polyamides, polysulfides, polyvinylformal (PVF), polyvinylbutyral (PVB), polyurethanes (PUR), polymers with carboxyl groups; polyamides, butadiene-acrylonitrile copolymers, styrene-acrylonitrile copolymers, butadiene-styrene copolymers, homo- or copolymers of unsaturated monomers, for example, from the group comprising ethylene, propylene, butylene, isobutylene, isoprene, vinyl acetate and alkyl (meth)acrylates, for example, chlorosulfonated polyethylenes and fluorine-containing polymers, sulfonamide-modified melamines and purified Montan waxes;

inorganic and organic fillers, for example, ground or precipitated calcium carbonates coated optionally with fatty acids, for example, stearates; barite (heavy spar), talcs, quartz flours, quartz sand, dolomites, wollastonites, kaolins, mica (potassium-aluminum silicate), molecular sieves, aluminum oxides, aluminum hydroxides, silicic acids, cements, gypsums, flue ashes, carbon black, graphite, metal powders, such as, aluminum, copper, iron, silver or steel, PVC powder or hollow beads;

fibers, for example, made of plastic or glass;

pigments, for example, titanium dioxide and iron oxides;

accelerators which accelerate the reaction between amino groups and epoxy groups, for example, acids or compounds that can be hydrolyzed to acids, for example, organic carboxylic acids, such as, acetic acid, benzoic acid, salicylic acid, 2-nitrobenzoic acid, lactic acid, organic sulfonic acids, such as, methanesulfonic acid, p-toluenesulfonic acid or 4-dodecylbenzenesulfonic acid, sulfonic acid esters, other organic or inorganic acids, such as, for example, phosphoric acids, or mixtures of the above-mentioned acids and acid esters; moreover tertiary amines, such as, 1,4-diazabicyclo[2.2.2]octane, benzyldimethylamine, α-methylbenzyldimethylamine, triethanolamine, dimethylaminopropylamine, salts of such tertiary amines, quaternary ammonium salts, such as, for example, benzyltrimethylammonium chloride, phenols, for example, bisphenols, phenol resins, and Mannich bases, such as, for example, 2-(dimethylaminomethyl)-phenol and 2,4,6-tris-(dimethylaminomethyl)-phenol, phosphites, such as, for example, di- and triphenyl phosphites, as well as mercapto group-comprising compounds, as already mentioned above;

rheology modifying agents, such as, for example, thickeners, for example, layer silicates, such as, bentonites, derivatives of castor bean oil, hydrated castor bean oil, polyamides, polyurethanes, urea compounds, pyrogenic silicic acids, cellulose ethers, and hydrophobically modified polyoxyethylenes;

bonding enhancers, for example, organoalkoxysilanes, such as, 3-glycidoxypropyltrimethoxysilane, 3-am inopropyltrimethoxysilane, N-(2-aminoethyl)-3-aminopropyltrimethoxysilane, N-(2-aminoethyl)-N'-[3-(trimethoxysilyl) propyl]ethylenediamine, 3-ureidopropyltrimethoxysilane, 3-chloropropyltrimethoxysilane, vinyltrimethoxysilanes, or the corresponding organosilanes with ethoxy groups instead of the methoxy groups;

stabilizers against oxidation, heat, light and UV radiation;

flame retardant substances, for example, compounds such as aluminum hydroxide ($Al(OH)_3$; also referred to as ATH for "aluminum trihydrate"), magnesium hydroxide ($Mg(OH)_2$; also referred to as MDH for "magnesium dihydrate"), ammonium sulfate (($NH_4)_2SO_4$), boric acid ($B(OH)_3$), zinc borate, melamine borate, and melamine cyanurate; phosphorus-containing compounds, such as, ammonium phosphate (($NH_4)_3PO_4$), ammonium polyphosphate, melamine phosphate, melamine pyrophosphate, triphenyl phosphate, diphenyl cresyl phosphate, tricresyl phosphate, triethyl phosphate, tris-(2-ethylhexyl) phosphate, trioctyl phosphate, mono-, bis- and tris-(isopropylphenyl)phosphate, resorcinol-bis(diphenyl phosphate), resorcinol-diphosphate oligomer, tetraphenyl-resorcinol diphosphite, ethylenediamine diphosphate, and bisphenol A-bis(diphenyl phosphate); halogen-containing compounds, such as, chloroalkyl phosphates, for example, tris-(chloroethyl)phosphate, tris-(chloropropyl) phosphate, and tris-(dichloroisopropyl)phosphate, polybrominated diphenyl ethers, for example, decabromodiphenyl ether, polybromimated diphenyl oxide, tris-[3-bromo-2,2-bis(bromomethyl)propyl]phosphate, tetrabromo-bisphenol A, bis-(2,3-dibromopropyl ether) of bisphenol A, brominated epoxy resins, ethylene-bis(tetrabromophtalimide), ethylene-bis(dibromonorbornane dicarboximide), 1,2-bis-(tribromophenoxy)ethane, tris-(2,3-dibromopropyl)isocyanurate, tribromophenol, hexabromocyclododecane, bis-(hexachlorocyclopentadieno) cyclooctane and chloroparaffins; as well as combinations of a halogen-containing compound and antimony trioxide ($Sb_2O_3$) or antimony pentoxide ($Sb_2O_5$);

surfactants such as, for example, crosslinking agents, levelling agents, aeration agents or defoaming agents;

biocides, such as, for example, algicides, fungicides or fungal growth-inhibiting substances.

The two-component epoxy resin composition can comprise additional auxiliary products and additives, for example, crosslinking agents, diluents, defoaming agents, stabilizers, pigments and accelerators, for example, salicylic acid or 2,4,6-tris-(dimethylaminomethyl)phenol.

The two-component epoxy resin composition can comprise less than 10 wt %, for example, less than 5 wt %, benzyl alcohol. For example, the two-component epoxy resin composition can be free of benzyl alcohol.

The resin component K1 and the hardener component K2 can each be stored in a suitable packaging or arrangement, such as, for example, a drum, a hobbock, a pouch, a bucket, a can, a cartridge, or a tube, before their use, for several months up to a year and longer, for example, without their respective properties changing to an extent of relevance for their use.

To use the two-component epoxy resin composition, the resin component K1 and the hardener component K2 are mixed with each other. The mixing ratio between the resin component K1 and the hardener component K2 can be selected in such a manner that the groups that are reactive with respect to epoxy groups, in the hardener component K2, are in a suitable ratio to the epoxy groups in the resin component K1.

The ratio of the number of groups that are reactive with respect to epoxy groups, in the hardener component K2, to the number of epoxy groups in the resin component K1 can be appropriately in the range from 0.5 to 1.5, for example, 0.8 to 1.2, wherein as many primary amino groups are not counted as groups that are reactive with respect to epoxy groups as there are aldehyde groups present in the resin component K1.

Primary amino groups with respect to epoxy groups can be bifunctional, and that a primary amino group can be counted as two groups that are reactive with respect to epoxy groups.

In parts by weight, the mixing ratio between the resin component K1 and the hardener component K2 can be in the range from 1:10 to 10:1.

The mixing of the two components can occur by means of an appropriate method. It can be carried out continuously or in batch mode. If the mixing occurs prior to the use, one can proceed such that not too much time passes between the mixing of the components and the application, because this can lead to disturbances, such as, for example, a slowed or incomplete development of the adhesion to the substrate. The mixing can be carried out, for example, at ambient temperature, which can be in the range from approximately 5 to 50° C., for example, approximately 10-30° C.

The curing of the described epoxy resin composition by chemical reaction can start with the mixing of the two components.

In the process, in the mixed composition, the aldehyde groups of the aldehyde from the resin component K1 react, for example, rapidly with primary amino groups of the polyamine A1 from the hardener component K2, with the formation of aldimino groups and water (condensation reaction). The primary amino groups of the polyamine A1, which have reacted in this manner, are therefore subsequently substantially no longer available for a reaction with epoxy groups, under the given reaction conditions. For example, the reaction of benzaldehyde with PEHA at a molar ratio of 2:1 is represented here as an example in the following formula diagram (V).

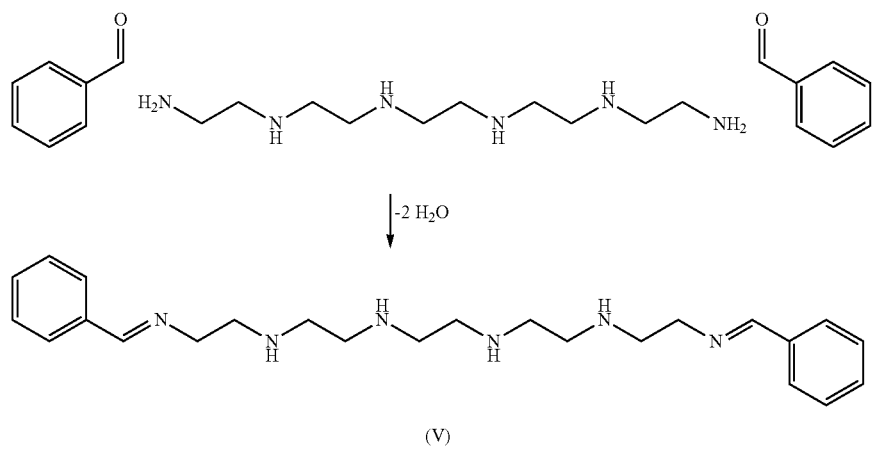

(V)

Here, after the reaction, a hardener can be produced according to the formula, which has four secondary amino groups, and which is free of primary amino groups. The water produced during the condensation reaction remains in the mixed composition, where it can have an accelerating effect during the curing under some circumstances. Depending on the ambient humidity, and on the temperature, the water can evaporate more or less rapidly from the composition.

For example, the NH hydrogens present in the mixed composition, and any additional groups that are present and reactive with respect to epoxy groups, start to react with epoxy groups with ring opening (addition reaction). As a result of these reactions, the composition polymerizes, and thus cures. In an exemplary embodiment, the described two-component epoxy resin composition, in spite of the lower content of primary amino groups, can cure surprisingly rapidly, also at relatively low temperatures in the range from 5 to 10° C.

The curing can occur at ambient temperature, which can be in the range from approximately 5 to 50° C., for example, approximately 10-30° C.

For example, the curing can take several days to weeks, until it is substantially completed under the given conditions. The duration can depend on the temperature, the reactivity of the components and their stoichiometry, and on the presence of accelerators, among other factors.

In an exemplary embodiment, a cured composition is provided which is prepared by mixing the resin component K1 and the hardener component K2 of a two-component epoxy resin composition as described above.

For example, a clear indication that the aldehyde binds covalently via aldimino groups to the cured polymer, during the curing of the two-component epoxy resin composition, can be obtained from the observation that, in exemplary two-component epoxy resin compositions, shortly after the mixing of the two components, the band in the IR spectrum is no longer detectable in the range from 1750 to 1650 cm$^{-1}$, which is typical for the given aldehyde group, while in the range from 1680 to 1620 cm$^{-1}$, the band which is typical for the respective corresponding aldimino group is clearly and unequivocally detectable.

In the case of areal application of the described epoxy resin composition, wherein the application is in the form of a thin film which typically has a layer thickness of approximately 50 μm to approximately 5 mm, to a substrate, a substantially clear, glossy and nonadhesive film can form during the curing, which is of excellent quantity in terms of hardness and viscosity as well as adhesion to the substrate. In contrast to the above, comparative compositions, for example, that contain no aldehyde in the resin component K1 cure to films with blushing-caused surface defects, such as, roughness, spottiness, turbidity, and tackiness.

The application of the described epoxy resin composition occurs on at least one substrate, wherein, as substrate, the following are exemplary:
glass, glass ceramic, concrete, mortar, brick, clay brick, gypsum and natural rock, such as granite or marble;
metals or alloys, such as, aluminum, steel, iron, non-ferrous metals, zinc-coated metals;
leather, textiles, paper, wood, resin-bonded wood materials, resin-textile composite materials, and additional so-called polymer composites;
plastics, such as, polyvinyl chloride (hard and soft PVC), acrylonitrile-butadiene-styrene copolymers (ABS), SMC (Sheet Moulding Compounds), polycarbonate (PC), polyamide (PA), polyester, poly(methylmethacrylate) (PMMA), polyesters, epoxy resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), wherein the plastics can, for example, be surface-treated by a plasma, corona or flame treatment; and
coated substrates, such as, powder coated metals or alloys; as well as paints and lacquers.

If desired, the substrates can be subjected to a preliminary treatment before the application of the epoxy resin composition. Such preliminary treatments comprise, for example, physical and/or chemical cleaning processes, for example, polishing, sandblasting, shot blasting, brushing or the like, wherein dust produced in the process can be removed by suctioning, and also a treatment with cleaners or solvents, or the application of an adhesion promoting agent, an adhesion promoting agent solution, or a primer.

The two-component epoxy resin composition can be suitable for areal applications.

The described epoxy resin composition can be used, for example, as a coating, floor cover, paint, lacquer, primer or base coat, as well as an adhesive, sealant or casting compound. In these uses, its excellent properties, such as, for example, waterproofness, corrosion protection, adhesion, resistance to chemicals, and/or hardness and viscosity are exploited. It can be used, for example, in above ground level construction or in underground construction, for example, as floor cover or as coating, for interior spaces, such as, offices, industrial halls, gymnasiums, or cooling chambers, or, outside, for balconies, terraces, parking decks, bridges or roofs, and as protective coating for concrete or metal, for example, as a protective paint against corrosion. It can be used for the manufacture or repair of industrial products or consumer products.

The described two-component epoxy resin composition can present various exemplary desired effects.

For example, the resin component K1 has a relatively low viscosity, since the epoxy resin is diluted surprisingly well by the aldehyde, for example, if the latter is liquid at room temperature. For a coating, a low basic viscosity can be a desirable prerequisite in order to ensure a good flow behavior, and thus a good application. Diepoxy liquid resins can have a rather high viscosity, and they can be diluted for use in coatings. The epoxy reactive diluents that can be used for the dilution in a comparative system can be expensive, they can have a strong irritating effect, and they can induce allergies. For example, the dilution effect of the aldehyde makes it possible to substantially or completely omit the use of epoxy reactive diluents or solvents. It can be substantially simpler to pigment the resin component K1 if desired, if its viscosity is excessively low.

The presence of the aldehyde in the resin component K1 as well as any pigmentation of the resin component K1 can have the effect of increasing the volume of said component, which can be desirable for setting the mixing ratio that is suitable in practice. For application as a coating, the hardener component can be transferred by pouring in the container of the resin component, and the two components are mixed in it, and applied from it. In such a use it can be desirable if the mixing ratio is set in such a manner that the resin component has a rather large volume and the hardener component a rather small volume, because otherwise it would be desirable for the resin component to be packaged in a container having a relatively large empty space, which can result in high container costs and a high space requirement during storage and during transport.

The use of the described odorless aldehydes ALD can present additional exemplary desirable effects. They can be odorless substances which have a relatively high molecular weight and a surprisingly good dilution effect, and which are not considered VOC. As a result, resin components K1 can be produced which are odorless and VOC-free, and which, under some circumstances, make it possible to completely omit the use of an epoxy reactive diluent.

For example, few blushing effects occur with the described composition, for example, in areal application. This can be presumably explained, for example, by the fact that the aldehyde can reduce the content of primary amino groups during the mixing of the components, by the described reaction, to such an extent that said groups no longer react detectably with $CO_2$. Surprisingly, this reaction, in spite of the absence of removal of the condensation water, and thus the absence of pressure on the reaction equilibrium, appears to take place rapidly, and to such an extent that the primary amino groups present in stoichiometric quantity with respect to the aldehyde no longer have sufficient time to react with $CO_2$. This also applies under unfavorable reaction conditions, that is reaction conditions favoring blushing, for example, at lower curing temperature and higher air humidity. Therefore, it is possible to substantially or completely omit the addition of the blushing-reducing additives of the prior art, which are not bound covalently in the composition during the curing, and which outgas as VOC, for example, as benzyl alcohol.

The aldehyde can be bound covalently to the primary amino groups during the reaction, and it can remain permanently in the cured composition, even in the presence of water. Thus, for example, hardly any outgassing of the aldehyde from the curing, or cured, composition occurs, which can have a desirable effect on the emission values as well as on the resistance to abrasion of the cured composition. The described composition can thus also be used, for example, in interior spaces.

The water formed during the reaction between the aldehyde and the primary amino groups can accelerate the curing.

During the curing of the described composition, substantially clear, glossy or slightly opaque and adhesion-free films can form, which have excellent mechanical properties, such as, for example, high hardness, good scratch resistance and toughness, as well as good adhesion on substrates of a great variety.

With the described composition, high-quality two-component epoxy resin systems are thus available, which, for example, after their curing, have only a low content of volatile organic compounds (VOC) or are VOC-free.

In an exemplary embodiment, the aldehyde is part of the resin component K1 and not of the hardener component K2. For example, if the aldehyde were used as part of the hardener component K2 and not of the resin component K1, then it would have no dilution effect in the resin component. During the areal use of an epoxy resin composition that is not according to the disclosure, the films that form have a clearly poorer quality.

In an exemplary embodiment, provided is the use of an aldehyde for diluting an epoxy resin or an epoxy resin composition. For example, suitable as aldehyde are the above-described aldehydes, for example, benzaldehyde or an aldehyde of formula (II).

In an exemplary embodiment, provided is a method for reducing blushing effects during the curing of a two-component epoxy resin composition, whose hardener component comprises at least one polyamine having at least one primary amino group, by adding an aldehyde to the resin component. As polyamine having at least one primary amino group, the above-described polyamines A1 are suitable, for example, the above-described polyamines A2 having at least one primary and one at least two secondary amino groups. The above-described aldehydes, for example, benzaldehyde or an aldehyde of formula (II), are suitable as aldehyde.

EXAMPLES

1. Description of the Measurement Methods

The viscosity was measured with a cone-plate viscometer Rheotec RC30 (cone diameter 50 mm, conical angle 1°, cone tip-plate separation 0.05 mm, shearing rate 10-100 s$^{-1}$).

2. Raw Materials Used

| | |
|---|---|
| Araldite ® GY 250 (Huntsman) | Bisphenol A diglycidyl ether, EEW approximately 187.5 g/Eq |
| Araldite ® DY-E (Huntsman) | Monoglycidyl ether of a $C_{12}$-$C_{14}$ alcohol, EEW approximately 290 g/Eq |
| Araldite ® HY-960 (Huntsman) | 2,4,6-Tris-(dimethylaminomethyl)phenol |
| Jeffamine ® D-230 (Huntsman) | Polypropylene glycol diamine, average molecular weight approximately 240 g/mol |
| Pentaethylenehexamine (Delamine) ("PEHA") | Technical, molecular weight approximately 232 g/mol, amino number approximately 1220 mg KOH/g |

-continued

| | |
|---|---|
| Tetraethylenepentamine (Delamine) ("TEPA") | Technical, molecular weight approximately 189 g/mol, amine number approximately 1350 mg KOH/g |
| N4-Amine (BASF) ("N4-amine") | N,N'-Bis(3-aminopropyl)ethylenediamine, molecular weight 174 g/mol |
| Diethylenetriamine (Delamine) ("DETA") | Technical, molecular weight approximately 103 g/mol |
| Isophoronediamine (Evonik) ("IPDA") | 1-Amino-3-aminomethyl-3,5,5-trimethylcyclohexane, molecular weight 170 g/mol |
| meta-Xylylenediamine (Mitsubishi Gas Chem.) "MXDA") | 1,3-Bis(aminomethyl) benzene, molecular weight 136 g/mol |
| "AP-Ald" | 3-Acetoxy-2,2-dimethylpropanal |
| "EH-Ald" | 2-Ethylhexanal |
| "LP-Ald" | 2,2-Dimethyl-3-lauroyloxypropanal |
| "MP-Ald" | 2,2-Dimethyl-3-(N-morpholino) propanal |
| "PP-Ald" | 2,2-Dimethyl-3-phenylpropanal | more than one ingredient), and subsequently the resin component was mixed with the hardener component in a centrifugal mixer (SpeedMixer™ DAC 150, FlackTek Inc.). Using the mixed compositions, in each case a film in a layer thickness of 500 μm was applied to a glass plate, and said film was stored at 23° C. and 50% relative humidity (=normal climate, hereafter abbreviated "NC"), respectively cured. After 4 weeks, the appearance of the films was evaluated. A film was considered "defect-free" if it was clear, and had a hard, glossy, and nonadhesive surface without structure. The term "structure" is used here to denote any type of marking or pattern on the surface. Moreover, the König hardness (pendulum hardness according to König, measured according to DIN EN ISO 1522) of the films was determined after 14 days ("König hardness (14 d)"), after 4 weeks ("König hardness (4 w)"), and after 5 months ("König hardness (5 mt)"). The odor of the mixed composition was evaluated twice by smelling with the nose at a separation of 1 cm, the first time 15 minutes after the mixing of the two components ("odor (15')"), and the second time after a curing time of 4 weeks ("odor (4 w)"). The results are reproduced in Table 1.

TABLE 1

Composition and properties of Comparison Examples 1-4 and of Examples 5-7

| Example | 1 (Compar.) | 2 (Compar.) | 3 (Compar.) | 4 (Compar.) | 5 | 6 | 7 |
|---|---|---|---|---|---|---|---|
| Resin component: | | | | | | | |
| Araldite ® GY-250 | 167.2 | 167.2 | 167.2 | 167.2 | 167.2 | 167.2 | 167.2 |
| Araldite ® DY-E | 31.8 | 31.8 | 31.8 | 31.8 | 31.8 | 31.8 | 31.8 |
| Benzyl alcohol | — | — | — | 27.0 | — | — | — |
| Benzaldehyde | — | — | — | — | 53.0 | 70.8 | 106.0 |
| Hardener component: | | | | | | | |
| PEHA | 29.0 | — | — | 29.0 | 58.0 | — | — |
| TEPA | — | 27.0 | — | — | — | 63.0 | — |
| N4-amine | — | — | 29.0 | — | — | — | 87.0 |
| Odor (15') | Amine | Amine | Amine | Amine | Amine | Amine | Amine |
| Odor (4 w) | None | None | None | None | None | None | None |
| König hardness (4 w) | n.m.[1] | n.m.[1] | n.m.[1] | 151 s | 163 s | 130 s | 70 s |
| Appearance | msc | msc | msc | kbB | df | df | df |

"Compar." stands for "Comparison"
"n.m." stands for "not measurable"
"Amine" stands for "smells slightly like an amine"
"msc" stands for "matte, strong structure, tacky coating"
"kbB" stands for "clear and glossy, but many small bubbles in the film"
"df" stands for "defect-free"
[1] The coating distorts the measurements 3. Preparation of Two-Component Epoxy Resin Compositions Comparison Examples 1-4 and Examples 5-7

For each one of the examples, a resin component and a hardener component were prepared separately, with the ingredients indicated in Table 1, in the indicated quantities (in parts by weight) (by mixing, if the component consisted of From the Comparison Examples 1-3 it is apparent that two-component epoxy resin compositions which contain PEHA, TEPA or N4-amine as hardener, applied by areal application, during the curing in NC tend to considerable blushing, leading to cured films of poor quality. From Comparison Example 4, it is evident that, although the addition of benzyl alcohol suppresses blushing, bubbles form during the curing.

From Examples 5-7 according to the disclosure it is evident that the benzaldehyde of the resin component prevents blushing during the curing, and that the mixed compositions no longer smell like benzaldehyde, already shortly after the mixing of the two components in each case, although benzaldehyde is a substance with, for example, a strong, almond-like odor which is still detectable even in the smallest concentrations.

Example 8 and Comparison Examples 9, 10 and 11

For each one of the examples, a resin component and a hardener component were prepared separately with the ingredients indicated in Table 2, in the quantities indicated (in parts by weight), and then mixed as described for Example 5. Using the mixed compositions, in each case three films in a layer thickness of 500 μm were applied to a glass plate, and said glass plates were stored under different conditions, respectively cured. All three films were weighed immediately after the application and then left to stand for 4 days in NC ("(4 d)"), and then the weight loss (in wt % with respect to the starting weight immediately after the application) was determined by renewed weighing. In each case one of the three plates was left in NC—marked "storage in NC" in the table—and, after 28 days, the weight loss ("(28 d)") with respect to the same starting weight was determined again by renewed weighing. The other two glass plates were stored in a circulating air oven at 80° C. In each case after 3, 7 and 14 days, the weight loss of these plates after cooling for 2 hours in NC was determined ("(3 d)," or "(7 d)" or "(14 d)"), with respect to the same starting weight, by renewed weighing. The appearance and the König hardness of the plates were determined in the same manner as for Example 5.
The results are indicated in Table 2.

It is evident from Table 2 that Example 8 according to the disclosure loses only slightly more weight than the water formed by the reaction of benzaldehyde with the primary amino groups of PEHA during the 80° C. storage. This low weight loss is clearly a sign that the benzaldehyde is bound to the cured epoxy polymer, and therefore does not evaporate at 80° C. Comparison Examples 9-11, on the other hand, lose considerably more weight during the 80° C. storage. Since benzyl alcohol is not bound to the epoxy polymer, most of it evaporates from the films. In Comparison Examples 9 and 10, which already presented bubbles in the film, the latter became clearly larger during the 80° C. storage.

Comparison Examples 12 and 13 and Examples 14-18

For each one of the examples, a resin component and a hardener component was prepared separately with the ingredients indicated in Table 3, in the indicated quantities (in parts by weight), and then mixed as described for Example 5. Using the mixed compositions, a film in a layer thickness of 500 μm was applied in each case to a glass plate, and the latter was stored in NC, respectively cured. After 5 months, the appearance of the films and the König hardness were determined in the same manner as for Example 5.

TABLE 2

Composition and properties of Example 8 and of Comparison Examples 9-11

| | | Example | | |
|---|---|---|---|---|
| | 8 | 9 (Comparison) | 10 (Comparison) | 11 (Comparison) |
| Resin component: | | | | |
| Araldite ® GY-250 | 167.2 | 167.2 | 167.2 | 167.2 |
| Araldite ® DY-E | 31.8 | 31.8 | 31.8 | 31.8 |
| Benzaldehyde | 53.0 | — | — | — |
| Benzyl alcohol | — | 27.0 | 43.3 | — |
| Hardener component: | | | | |
| PEHA | 58.0 | 29.0 | — | — |
| DETA | — | — | 20.6 | — |
| IPDA | — | — | — | 42.5 |
| Benzyl alcohol | — | — | — | 47.2 |
| Salicylic acid | — | — | — | 4.7 |
| Benzyl alcohol content | — | 10.5 wt % | 16.5 wt % | 16.1 wt % |
| Theoretical water content[1] | 2.9 wt % | — | — | — |
| Storage in NC: | | | | |
| Weight loss | 1.5% (4d) | 1.3% (4d) | 2.7% (4d) | 1.9% (4d) |
| | 1.5% (28d) | 1.3% (28d) | 3.7% (28d) | 2.3% (28d) |
| Appearance | defect-free | clear, fine bubbles | clear, fine bubbles | defect-free |
| König hardness (4w) | 165 s | 151 s | 122 s | 160 s |
| Storage at 80° C.: | | | | |
| Weight loss | 4.5% (3d) | 7.6% (3d) | 15.1% (3d) | 8.8% (3e) |
| | 5.1% (7d) | 8.5% (7d) | 16.0% (7d) | 10.5% (7d) |
| | 5.1% (14d) | 8.9% (14d) | 16.8% (14d) | 12.0% (14d) |
| Appearance | yellow, slightly matte | yellowish, larger bubbles | yellowish, larger bubbles | yellowish |
| König hardness (14d) | 189 s | n.m.[2] | n.m.[2] | 182 s |

"n.m." stands for "not measurable"
[1] from the aldimine formation
[2] Bubbles distort the measurements The results are indicated in Table 3.

PEHA-aldimine-1 was prepared as follows:

29 parts by weight PEHA were used to start; 26.5 parts by weight benzaldehyde were added under stirring, and then the water produced was removed from the reaction mixture at 80° C. and under a vacuum for one hour.

It is evident from Table 3 that the benzaldehyde dose of Examples 14-16 is sufficiently high to substantially prevent blushing effects during the curing, while the films of Examples 17 and 18 present signs of slight blushing. Moreover, it is evident that the films of Examples 15 and 16 present the highest hardness values. The films of Examples 17 and 18 present a lower hardness, presumably also due to slight blushing effects.

TABLE 3

Composition and properties of Comparison Examples 12 and 13 and of Examples 14-18

| Example | 12 (Compar.) | 13 (Compar.) | 14 | 15 | 16 | 17 | 18 |
|---|---|---|---|---|---|---|---|
| Resin component: | | | | | | | |
| Araldite ® GY-250 | 167.2 | 167.2 | 167.2 | 167.2 | 167.2 | 167.2 | 167.2 |
| Araldite ® DY-E | 31.8 | 31.8 | 31.8 | 31.8 | 31.8 | 31.8 | 31.8 |
| Benzaldehyde | — | — | 53.0 | 43.4 | 35.4 | 28.5 | 22.7 |
| Hardener component: | | | | | | | |
| PEHA | — | 58.0 | 58.0 | 52.7 | 48.3 | 44.6 | 41.4 |
| Benzaldehyde | — | 53.0 | — | — | — | — | — |
| PEHA-Aldimine-1 | 102.0 | — | — | — | — | — | — |
| Aldehyde/$NH_2$[1] | 1.0 | 1.0 | 1.0 | 0.9 | 0.8 | 0.7 | 0.6 |
| König hardness (5 mt) | 167 s | 171 s | 185 s | 193 s | 197 s | 167 s | 134 s |
| Appearance | slightly turbid, slightly tacky | slightly turbid | defect-free | defect-free | minimally turbid | slightly turbid, slightly tacky | slightly turbid, slightly tacky |

[1]Ratio of the number of aldehyde groups to the number of primary amino groups.

Comparison Examples 12 and 13 comprise benzaldehyde as component of the hardener component instead of the resin component, wherein, in Comparison Example 12, the water formed during the aldimine formation was removed. The corresponding cured films, however, are of poorer quality than the cured film of Example 14, both in terms of appearance and also hardness.

Examples 19-24

For each one of the examples, a resin component and a hardener component was produced separately with the ingredients indicated in Table 4, in the indicated quantities (in parts by weight), and then mixed as described for Example 5. Using the mixed compositions, in each case a film in a layer thickness of 500 μm was applied to a glass plate, and the latter was stored in NC, respectively cured. After 4 weeks, the appearance of the film and the König hardness were determined in the same manner as described for Example 5.

The results are indicated in Table 4.

TABLE 4

Composition and properties of Examples 19-24.

| Example | 19 | 20 | 21 | 22 | 23 | 24 |
|---|---|---|---|---|---|---|
| Resin comp.: | | | | | | |
| Araldite ® GY-250 | 167.2 | 167.2 | 167.2 | 187.5 | 187.5 | 167.2 |
| Araldite ® DY-E | 31.8 | 31.8 | 31.8 | — | — | 31.8 |
| Benzaldehyde | 47.8 | 47.8 | 47.8 | — | — | 17.1 |
| LP-Ald | — | — | — | 71.0 | 47.3 | — |
| Hardener comp.: | | | | | | |
| PEHA | 52.2 | 52.2 | 52.2 | 29.0 | — | — |
| IPDA | 4.25 | — | — | 21.25 | 28.3 | 28.3 |
| MXDA | — | 3.4 | — | — | — | — |
| Jeffamine ® D-230 | — | — | 6.0 | — | 40.0 | 40.0 |
| Araldite ® HY-960 | — | — | — | 6.0 | — | — |
| König hardness (4 w) | 164 s | 150 s | 154 s | 161 s | 157 s | 170 s |
| Appearance | clear, fine structure | defect-free | defect-free | clear, fine structure | opaque, minimal structure | clear, fine structure |

"Comp." stands for "component"

It is evident from Table 4 that Examples 19-22 which comprise a combination of PEHA and IPDA, or MXDA, or Jeffamine® D-230, as hardener, and wherein benzaldehyde, respectively L-Ald, is added by metering in each case stoichiometrically with respect to the primary amino groups of PEHA, cure to qualitatively good films. Moreover, it is evident from Table 4 that Examples 23 and 24, which both comprise a hardener component without secondary amino groups, cured to a qualitatively good films.

Examples 25-31

For each one of the examples, a resin component and a hardener component were produced with the ingredients indicated in Table 5, in the indicated quantities (in parts by weight), and subsequently mixed as described for Example 5. Using the mixed compositions, in each case a film in a layer thickness of 500 μm was applied to a glass plate, and the latter was stored in NC, respectively cured. After 5 months, the appearance of the film and the König hardness were determined in the same manner as described for Example 5. The results are indicated in Table 5.

TABLE 5

Composition and properties of Examples 25-31

| Example | 25 | 26 | 27 | 28 | 29 | 30 | 31 |
|---|---|---|---|---|---|---|---|
| Resin comp.: | | | | | | | |
| Araldite ® GY-250 | 167.2 | 167.2 | 167.2 | 167.2 | 167.2 | 167.2 | 187.5 |
| Araldite ® DY-E | 31.8 | 31.8 | 31.8 | 31.8 | 31.8 | 31.8 | — |
| Benzaldehyde | 38.6 | — | — | — | — | — | — |
| LP-Ald | 38.6 | — | — | — | — | — | 142.0 |
| EH-Ald | — | 64.1 | — | — | — | — | — |
| PP-Ald | — | — | 81.0 | — | — | — | — |
| AP-Ald | — | — | — | 72.0 | — | — | — |
| MP-Ald | — | — | — | — | 85.5 | — | — |
| Salicylaldehyde | — | — | — | — | — | 61.0 | — |
| Hardener comp.: | | | | | | | |
| PEHA | 58.0 | 58.0 | 58.0 | 58.0 | 58.0 | 58.0 | 58.0 |
| König hardness (5 mt) | 105 s | 56 s | 145 s | 115 s | 95 s | 220 s | 50 s |
| Appearance | defect-free | clear, fine structure | defect-free | defect-free | defect-free | defect-free, yellow | defect-free |

"Comp." stands for "Component"

It is evident from Table 5 that using aldehydes combined with PEHA, films of good quality are obtained.

Examples 32-35

For each one of the examples, a resin component and a hardener component were prepared with the ingredients indicated in Table 6, in the indicated quantities (in parts by weight), and then mixed as described for Example 5. Using the mixed compositions, in each case a film in a layer thickness of 500 μm was applied to the glass plate, the latter was stored in NC, respectively cured. After 4 weeks, the appearance of the film and the König hardness were determined in the same manner as described for Example 5. The results are indicated in Table 6.

The adduct 1 was prepared as follows:
36.8 g N4-amine were mixed with 13.2 g Araldite GY-250 and left to stand for 2 hours at 60° C. A clear fluid formed having a viscosity at 20° C. of 1.1 Pa·s.

The adduct 2 was prepared as follows:
20.0 g adduct 1 were mixed with 11.2 g benzaldehyde. A clear fluid having a viscosity at 20° C. of 76.8 Pa·s formed.

The adduct 3 was prepared as follows:
10.26 g TEPA and 19.55 g Jeffamine® D-230 were mixed with 10.18 g Araldite® GY-250, and left to stand for 2 hours at 60° C. A clear fluid having a viscosity at 20° C. of 3.5 Pa·s formed.

It is evident from Table 6 that the compositions which contain, as polyamine A1, an amine/polyepoxy adduct having primary and secondary amino groups, cured to qualitatively good films exhibiting hardly any blushing.

TABLE 6

Composition and properties of Examples 32-35

| | Example | | | |
|---|---|---|---|---|
| | 32 | 33 | 34 | 35 |
| Resin component: | | | | |
| Araldite ® GY-250 | 167.2 | 187.5 | 187.5 | 187.5 |
| Araldite ® DY-E | 31.8 | — | — | — |
| Benzaldehyde | 75.8 | 56.9 | — | — |
| LP-Ald | — | 50.7 | 50.7 | 28.4 |
| Hardener component: | | | | |
| Adduct 1 | 101.4 | 101.4 | — | — |
| Adduct 2 | — | — | 158.3 | — |
| Adduct 3 | — | — | — | 73.7 |
| König hardness (4w) | 195 s | 172 s | 154 s | 200 s |
| Appearance | defect-free | defect-free | clear, fine structure | minimally turbid |

Example 36

Using the composition of Example 5, a film in a layer thickness of 500 μm was applied six times to glass plates, and said plates were stored under different conditions, as described below.

Plate No. 1 was stored for 21 days in NC (marked "NC" in Table 7).

Plate No. 2 was stored for 11 days in NC, then immersed for 7 days in water, and then stored again for 3 days in NC (marked "NC, H₂O" in Table 7).

Plate No. 3 was stored for 11 days in NC, then for 7 days at 70° C. and 100% relative humidity, and then again for 3 days in NC (marked "NC, 70/100" in Table 7).

Plate No. 4 was stored for 4 days in NC, then for 7 days in a circulating air oven at 80° C., and then again for 10 days in NC (marked "80° C." in Table 7).

Plates No. 5 were stored for 4 days in NC, then for 7 days in a circulating air oven at 80° C., then immersed for 7 days in water, and then stored again for 3 days in NC (marked "80° C., H₂O" in Table 7).

Plate No. 6 was stored for 4 days in NC, then for 7 days in a circulating air oven at 80° C., then for 7 days at 70° C. and 100% relative air humidity, and then again for 3 days in NC (marked "80° C., 70/100" in Table 7).

All the plates were weighed immediately after the application of the composition and then stored as described, and subsequently the weight loss was measured by renewed weighing, and the appearance and the König hardness were determined in the same manner as described for Example 5. The results are indicated in Table 7.

TABLE 7

Results of Example 36

| Plate | No. 1 | No. 2 | No. 3 | No. 4 | No. 5 | No. 6 |
|---|---|---|---|---|---|---|
| Storage | NC | NC, H₂O | NC, 70/100 | 80° C. | 80° C., H₂O | 80° C., 70/100 |
| Weight loss | 1.5% | 0.5% | 2.8% | 3.4% | 2.8% | 3.7% |
| König hardness | 155 s | 153 s | 167 s | 189 s | 177 s | 188 s |
| Appearance | df | df | df | ym | ym | ym |

"df" stands for "defect-free"
"ym" stands for "yellow, slightly matte"

It is evident from Table 7 that storage for 7 days in water, respectively at 70° C. and 100% relative air humidity, has no substantial effect on the properties of the cured composition. For example, it is apparent that even in a wet, respectively a moist and warm, environment, benzaldehdye is not released to a substantial extent from the cured composition.

Examples 37 and 38 and Comparison Examples 39 and 40

For each one of the examples, a resin component was prepared with the ingredients indicated in Table 8, in the indicated quantities (in parts by weight), and subsequently the viscosity was determined.

The results are indicated in Table 8.

TABLE 8

Composition and viscosity of Examples 37 and 38 and of the Comparison Examples 39 and 40

| | Example | | | |
|---|---|---|---|---|
| | 37 | 38 | 39 (Comparison) | 40 (Comparison) |
| Araldite® GY-250 | 80 | 80 | 80 | 100 |
| Benzyl alcohol | — | — | 20 | — |
| Benzaldehyde | 20 | — | — | — |
| LP-Ald | — | 20 | — | — |
| Viscosity at 20° C. | 0.5 Pa·s | 1.2 Pa·s | 0.7 Pa·s | 18.6 Pa·s |

It is evident from Table 8 that both benzaldehyde and also LP-Ald dilute the epoxy resin Araldite® GY-250 similarly to, or even better than, benzyl alcohol.

Examples 41-43 and Comparison Examples 44 and 45

For each one of the examples, a resin component was prepared with the ingredients indicated in Table 9, in the indicated quantities (in parts by weight), and subsequently the viscosity at 20° C. of each composition was measured (marked "Visc. (Start)" in Table 9), and then each composition was filled into two aluminum tubes and sealed airtight.

In each case one of the tubes was stored for 7 days at 20° C. and then the viscosity was measured at 20° C. (marked "Visc. (7 d 20° C.)" in Table 9).

The second tube was stored for 7 days at 60° C., and in each case the viscosity was subsequently measured at 20° C. (marked "Visc. (7 d 60° C.)" in Table 9).

The results are indicated in Table 9.

It is evident from Table 9 that all the tested resin components (Examples 41-43 and Comparison Examples 44 and 45) presented no measurable viscosity increase in the case of storage for 7 days at room temperature, respectively only a slight viscosity increase in the case of storage for 7 days at 60° C.

TABLE 9

Composition and properties of Examples 41-43 and of Comparison Examples 44 and 45

| | Example | | | | |
|---|---|---|---|---|---|
| | 41 | 42 | 43 | 44 (Comparison) | 45 (Comparison) |
| Araldite® GY-250 | 167.2 | 167.2 | 187.5 | 167.2 | 167.2 |
| Araldite® DY-E | 31.8 | 31.8 | — | 31.8 | 31.8 |
| Benzaldehyde | 53.0 | — | — | — | — |
| Salicylaldehyde | — | 61.0 | — | — | — |
| LP-Ald | — | — | 50.7 | — | — |
| Benzyl alcohol | — | — | — | 50.0 | — |
| Visc. (Start) [mPa·s] | 195 | 205 | 1200 | 230 | 1020 |
| Visc. (7d 20° C.) [mPa·s] | 195 | 205 | 1200 | 230 | 1020 |
| Visc. (7d 60° C.) [mPa·s] | 210 | 225 | 1250 | 245 | 1100 |

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A two-component epoxy resin composition, comprising:
   a resin component K1 which includes at least one epoxy resin and at least one aldehyde, and
   a hardener component K2 which includes at least one polyamine A1 having at least one primary amino group,
   wherein a ratio of a number of aldehyde groups in the resin component K1 to a number of primary amino groups in the hardener component K2 is in a range from 0.1 to 1.1.

2. The two-component epoxy resin composition according to claim 1, wherein the aldehyde is selected from the group consisting of 2-ethylbutanal, pentanal, pivalaldehyde, 2-methylpentanal, 3-methylpentanal, 4-methylpentanal, 2,3-dimethylpentanal, hexanal, 2-ethylhexanal, heptanal, octanal, methoxyacetaldehyde, 2,2-dimethyl-3-phenylpropanal, benzaldehyde, 1-naphthaldehyde, salicylaldehyde, an aldehyde of formula (II), and a combination thereof:

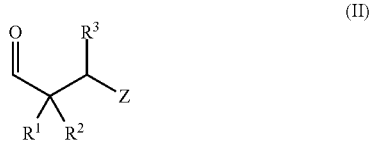

(II)

where $R^1$ and $R^2$
in each case stands, independently of each other, for a monovalent hydrocarbon residue having 1-12 C atoms,
or together stand for a bivalent hydrocarbon residue having 4-12 C atoms, which is part of an optionally substituted carbocyclic ring having 5-8 C atoms;
$R^3$ stands for a hydrogen atom or for an arylalkyl or cycloalkyl or alkyl group having 1-12 C atoms; and
Z stands for an ester, ether, tertiary amino or amido group having up to 31 C atoms, which groups optionally contain additional ether oxygens.

3. The two-component epoxy resin composition according to claim 2, wherein Z stands for a residue of formula (III) or (IV),

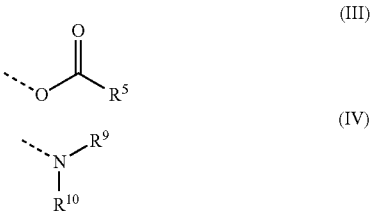

(III)

(IV)

where $R^5$
stands either for a hydrogen atom
or for a linear or branched alkyl residue having 1-30 C atoms, optionally with cyclic portions, and optionally with at least one heteroatom,
or for a singly or multiply unsaturated, linear or branched hydrocarbon residue having 5-30 C atoms,
or for an optionally substituted aromatic or heteroaromatic, 5- or 6-membered ring; and
$R^9$ and $R^{10}$,
independently of each other, in each case stand either for a monovalent aliphatic, cycloaliphatic or arylaliphatic residue having 1-20 C atoms, which optionally contains heteroatoms in the form of ether oxygen or tertiary amine nitrogen,
or together they stand for a bivalent aliphatic residue having 3-20 C atoms, which is part of an optionally substituted, heterocyclic ring having 5-8 ring atoms, and contains, besides the nitrogen atom, optionally additional heteroatoms in the form of ether oxygen or tertiary amine nitrogen.

4. The two-component epoxy resin composition according to claim 3, wherein $R^5$ has 11-20 C atoms.

5. The two-component epoxy resin composition according to claim 2, wherein $R^1$ and $R^2$ each stand for a methyl residue.

6. The two-component epoxy resin composition according to claim 2, wherein the aldehyde is an aldehyde of formula (II), where $R^1$ and $R^2$ together stand for a bivalent hydrocarbon residue having 4-12 C atoms, which is part of an optionally substituted carbocyclic ring having 6 C atoms.

7. The two-component epoxy resin composition according to claim 2, wherein the aldehyde is an aldehyde of formula (II), wherein $R^3$ stands for a hydrogen atom.

8. The two-component epoxy resin composition according to claim 3, wherein Z stands for a residue of formula (III), wherein $R^5$ stands for a linear or branched alkyl residue having 6-30 C atoms.

9. The two-component epoxy resin composition according to claim 3, wherein Z stands for a residue of formula (III), wherein $R^5$ stands for a linear or branched alkyl residue having 11-30 C atoms.

10. The two-component epoxy resin composition according to claim 3, wherein Z stands for a residue of formula (III), wherein $R^5$ stands for a linear or branched alkyl residue with at least one heteroatom that is oxygen in the form of an ether, carbonyl or ester group.

11. The two-component epoxy resin composition according to claim 3, wherein Z stands for a residue of formula (IV), wherein $R^9$ and $R^{10}$ together stand for a bivalent aliphatic residue having 3-20 C atoms, which is part of an optionally substituted, heterocyclic ring having 6 ring atoms.

12. The two-component epoxy resin composition according to claim 1, wherein the aldehyde is selected from the group consisting of benzaldehyde, salicylaldehyde, 2,2-dimethyl-3-phenylpropanal, 3-acetoxy-2,2-dimethylpropanal, 2,2-dimethyl-3-lauroyloxypropanal, 2,2-dimethyl-3-(N-morpholino)-propanal, and a combination thereof.

13. The two-component epoxy resin composition according to claim 1, wherein the resin component K1 has an aldehyde content of at least 1 wt %.

14. The two-component epoxy resin composition according to claim 1, wherein the epoxy resin is a liquid resin based on a bisphenol.

15. The two-component epoxy resin composition according to claim 1, wherein the polyamine A1 is a polyamine A2 having at least one primary and at least two secondary amino groups.

16. The two-component epoxy resin composition according to claim 15, wherein the polyamine A2 is selected from the group consisting of:
triethylenetetramine (TETA), tetraethylenepentamine (TEPA), pentaethylenehexamine (PEHA), polyethylenepolyamine having 5-7 ethyleneamine units (NEPA), N,N'-bis(3-aminopropyl)ethylenediamine;
adducts of diethylenetriamine (DETA), dipropylenetriamine (DPTA), bis-hexamethylenetriamine (BHMT), triethylenetetramine (TETA), tetraethylenepentamine (TEPA), pentaethylenehexamine (PEHA), polyethylenepolyamine having 5-7 ethyleneamine units (HEPA) or N,N'-bis(3-aminopropyl)ethylenediamine with a diglycidyl ether;
a polyamidoamine; and
a combination thereof.

17. A cured composition formed from the two-component epoxy resin composition according to claim 1, wherein the cured composition is obtained by mixing the resin component K1 and the hardener component K2.

18. A method of using the two-component epoxy resin composition according to claim 1, the method comprising mixing the resin component K1 and the hardener component K2.

19. The method of using the two-component epoxy resin composition according to claim 18, wherein the mixture of the resin component K1 and the hardener component K2 is used as a coating, floor cover, paint, lacquer, primer, base coat, adhesive, sealant or casting composition.

20. The two-component epoxy resin composition according to claim 1, wherein the composition consists of the resin component K1 and the hardener component K2.

21. The two-component epoxy resin composition according to claim 1, wherein the aldehyde is selected from the group consisting of 3-acetoxy-2,2-dimethylpropanal, 2,2-dimethyl-3-lauroyloxypropanal, 2,2-dimethyl-3-(N-morpholino)-propanal, and 2,2-dimethyl-3-bis-(methoxyethyl)-aminopropanal.

22. The two-component epoxy resin composition according to claim 1, wherein the resin component K1 has an aldehyde content of at least 3 wt %.

23. The two-component epoxy resin composition according to claim 1, wherein the epoxy resin is a liquid resin based on a bisphenol A, bisphenol F or bisphenol A/F.

* * * * *